(12) United States Patent
Kim

(10) Patent No.: US 7,859,487 B2
(45) Date of Patent: Dec. 28, 2010

(54) IMAGE DISPLAY DEVICE AND METHOD OF CONTROLLING AN IMAGE DISPLAY DEVICE

(75) Inventor: Ji Woon Kim, Goomi-si (KR)

(73) Assignee: LG Electronics Inc., Seoul (KR)

( * ) Notice: Subject to any disclaimer, the term of this patent is extended or adjusted under 35 U.S.C. 154(b) by 863 days.

(21) Appl. No.: 11/526,792

(22) Filed: Sep. 26, 2006

(65) Prior Publication Data
US 2007/0195075 A1 Aug. 23, 2007

(30) Foreign Application Priority Data
Feb. 17, 2006 (KR) ...................... 10-2006-0015879

(51) Int. Cl.
*G09G 3/20* (2006.01)
(52) U.S. Cl. ...................... 345/74.1; 710/36
(58) Field of Classification Search ............... 710/72, 710/73, 36, 37, 40; 719/321; 725/139–141; 345/74.1–75.2
See application file for complete search history.

(56) References Cited

U.S. PATENT DOCUMENTS

| | | | |
|---|---|---|---|
| 4,458,178 A | 7/1984 | Tenney et al. | |
| 4,847,602 A * | 7/1989 | Altland et al. | 361/679.21 |
| 5,493,179 A | 2/1996 | Tanizoe | |
| 6,229,575 B1 * | 5/2001 | Vaughan et al. | 348/564 |
| 6,331,876 B1 | 12/2001 | Koster et al. | |
| 6,779,047 B1 * | 8/2004 | Caddes et al. | 710/15 |
| 2004/0015941 A1 | 1/2004 | Sekine | |

FOREIGN PATENT DOCUMENTS

| | | |
|---|---|---|
| CN | 1529515 A | 9/2004 |
| CN | 165449 A | 7/2005 |
| JP | 2000-278621 | 10/2000 |
| WO | 00/70867 | 11/2000 |

OTHER PUBLICATIONS

European Search Report dated Dec. 1, 2008.
Chinese Office Action dated Jan. 16, 2009 and English language translation.

* cited by examiner

*Primary Examiner*—Amr Awad
*Assistant Examiner*—Aaron Midkiff
(74) *Attorney, Agent, or Firm*—KED & Associates, LLP

(57) ABSTRACT

An image display device and a method of controlling an image display device are provided. The image display device may include a signal processor having a plurality of input/output ports to control a degaussing operation and a data download, a degaussing circuit connected a first port of the signal processor to perform the degaussing operation during a first mode, and a download interface connected to the first port of the signal processor to download data on the signal processor during a second mode.

19 Claims, 3 Drawing Sheets

US 7,859,487 B2

IMAGE DISPLAY DEVICE AND METHOD OF CONTROLLING AN IMAGE DISPLAY DEVICE

The present application claims priority from Korean Application No. 15879/2006, filed Feb. 17, 2006, the subject matter of which is incorporated herein by reference.

BACKGROUND

1. Field

Embodiments of the present invention may relate to an image display device and a method of controlling an image display.

2. Background

An image display device may select and demodulate various broadcasting signals transmitted from broadcasting stations. The image display device may separate a received broadcasting signal into audio and video, and then display the audio and the video through audio processing and video processing.

The image display device may include various kinds of input and output ports connected to an external device to send and receive data or perform specific functions.

SUMMARY

Embodiments of the present invention may be directed to an image display device and a method of controlling the image display device that substantially obviate one or more problems of disadvantageous arrangements.

Embodiments of the present invention may provide an image display device utilizing and/or maximizing space of a printed circuit board (PCB) by allowing one input/output port to perform a plurality of functions, and thereby allow a design to be easily done.

Embodiments of the present invention may provide an image display device having an ability to download programs stored in a computer on the image display device.

Embodiments of the present invention may provide an image display device that includes a signal processor, a degaussing unit and a download unit. The signal processor may have a plurality of input/output ports to control a degaussing operation and a data download. The degaussing unit may be connected to a first input/output port of the signal processor to perform the degaussing operation during a first mode. The download unit may be connected to the first input/output port of the signal processor to download data on the signal processor during a second mode.

Embodiments of the present invention may provide an image display device that includes a signal processor, a first operating unit and a download unit. The signal processor may have a plurality of input/output ports. The first operating unit may be connected to a first input/output port of the signal processor to perform predetermined operations. The download unit may be connected to the first input/output port of the signal processor to have a download port for a data download. The signal processor may allow the first operating unit to be operated or data to be downloaded according to whether a download interface is connected to the download port or not.

Embodiments of the present invention may provide a method of controlling an image display device. The method may include supplying a power source to a signal processor, determining whether a download interface is electrically connected to a download unit connected a first input/output port of the signal processor, and performing a download operation when the download interface is inserted. The method may also include performing functions of another operating unit connected to the first input/output port when the download interface is not inserted.

Additional advantages, objects and embodiments may be set forth in part in the description that follows and in part will become apparent to those having ordinary skill in the art upon examination of the following or may be learned from practice. Objectives and other advantages of embodiments may be realized and attained by the structure particularly pointed out in the written description and claims hereof as well as the appended drawings. Both the foregoing and the following detailed description are exemplary and explanatory and are intended to provide further explanation.

BRIEF DESCRIPTION OF THE DRAWINGS

The accompanying drawings are included to provide a further understanding of embodiments of the present invention and are incorporated in and constitute a part of this application. In the following drawings like reference numerals refer to like elements and wherein.

DETAILED DESCRIPTION

Figure 1:
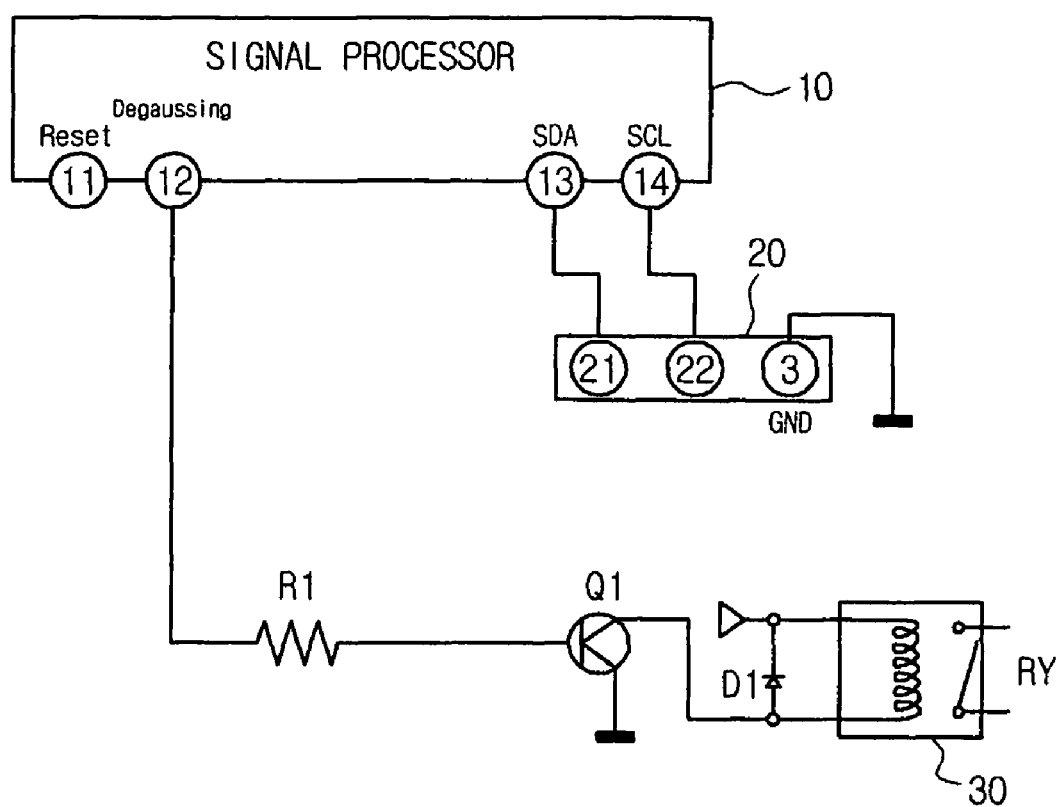
FIG. 1 is a diagram illustrating inputs and outputs of an image display device according to an example arrangement.

FIG. 1 is a diagram illustrating inputs and outputs of an image display device according to one arrangement. Other arrangements are also possible.

The image display device shown in FIG. 1 includes a signal processor 10 having a plurality of ports 11, 12, 13 and 14 and an interface 20 connected to a SDA port 13 and a SCL port 14 of the signal processor 10 to update programs stored in the signal processor 10. The image display device may also include a degaussing circuit 30 connected to a degaussing port 12 of the signal processor 10 to perform degaussing. The signal processor 10 may additionally include a reset port 11.

The image display device may further include a first resistor R1, a transistor Q1 and a diode D1. One end of the first resistor R1 may be coupled to the degaussing port 12 of the signal processor 10 and the other end may be coupled to the transistor Q1. A base the transistor Q1 may be coupled to the other end of the first resistor R1. An anode of the diode D1 may be coupled to a collector of the transistor Q1 and a cathode of the diode D1 may be coupled to an input terminal of the degaussing circuit 30. The degaussing circuit 30 may also include a relay device RY.

The degaussing circuit 30 may perform a degaussing operation to remove magnetization of a shadow mask in the image display device using a cathode-ray tube (CRT). In the degaussing operation, a high voltage may be applied over several seconds when a power source is applied to the image display device.

The interface 20 may include two ports 21 and 22 connected to a computer to provide functions for editing programs stored in the signal processor 10 in a visual environment. For example, registers of the programs may be modified in the visual environment.

When a high signal is outputted through the degaussing port 12 of the signal processor 10 to perform the degaussing, a high signal may be supplied to the base of the transistor Q1 and the transistor Q1 may be turned ON. The relay device RY of the degaussing circuit 30 may be operated and the degaussing may be performed.

The image display device may include the degaussing port 12 that is operated only at a time of power-on. Thus, there may be a problem in utilizing space of a printed circuit board (PCB).

The image display device may also provide a function to modify stored programs using ports 21 and 22, for example, connected to a computer or other device. However, such an image display device may not provide functionality to download an updated program onto the image display device.

Figure 2:
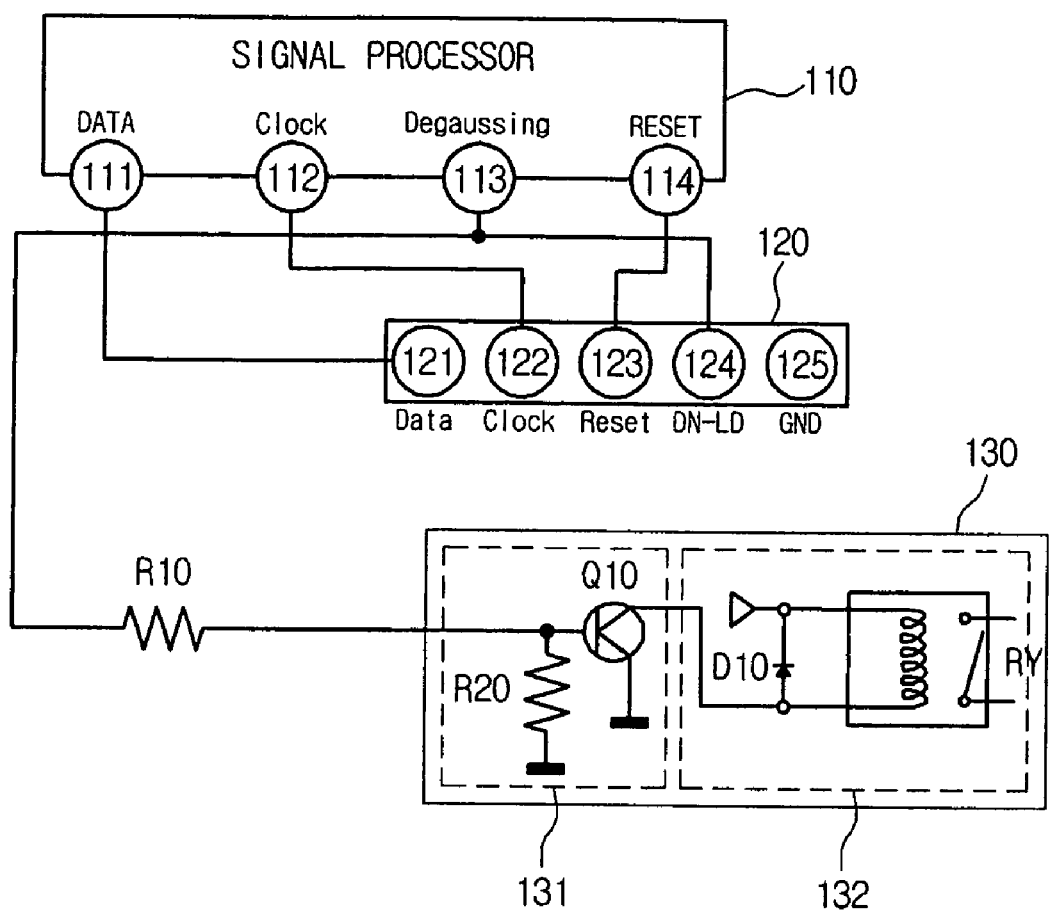
FIG. 2 is a diagram illustrating an image display device according to an example embodiment of the present invention.

FIG. 2 is a diagram illustrating an image display device according to an example embodiment of the present invention. Other configurations and embodiments are also within the scope of the present invention. As one example, the image display device may be a cathode ray tube (CRT). Other image display devices may also be provided.

FIG. 2 shows that an image display device includes a signal processor 110 (or signal processing unit), a degaussing circuit 130 (or degaussing unit), and a download interface 120 (or download unit). The signal processor 110 has a plurality of input/output ports 111, 112, 113 and 114 and controls a degaussing operation and a data download operation. The signal processor 110 may also control other operations such as those discussed below. The degaussing circuit 130 is connected to a degaussing port 113 of the signal processor 110 to perform the degaussing operation during a first mode. The download interface 120 is connected to the degaussing port 113 of the signal processor 110 to download data onto the signal processor 110 during a second mode.

Additionally, the signal processor 110 includes a DATA port 111 transmitting a data signal, a Clock port 112 outputting a clock signal, a degaussing port 113, and a port 114 outputting a reset signal. Other ports may also be provided.

The download interface 120 includes a DATA port 121 connected to the DATA port 111, a clock port 122 connected to the clock port 112, a reset port 123 connected to the reset port 114, a download port 124 connected to the degaussing port 113, and a ground port 125 connected to ground. Other ports may also be provided.

The download interface 120 can be an input/output port circuit formed on the back of the image display device.

The degaussing circuit 130 is connected to the degaussing port 113. The degaussing circuit 130 includes a switching circuit 131 and a degaussing operating circuit 132. The switching circuit 131 may include a second resistor R20 and a transistor Q10. The degaussing operating circuit 132 may also include a diode D10 and a relay device RY.

The degaussing circuit 130 may further include a first resistor R10. One end of the first resistor R10 may be connected to the degaussing port 113. A base of the transistor Q10 may be connected to the other end of the first resistor R10. One end of the second resistor R20 may be connected to a base of the transistor Q10 and the other end of the second resistor R20 may be connected to ground. An anode of the diode D10 may be connected to a collector of the transistor Q10 and a cathode of the diode D10 may be connected to an input terminal of the degaussing operating circuit 132.

Operation of the image display device will now be described.

When a power source is applied (such as to the signal processor), the signal processor 110 recognizes a power-on, and a high signal is outputted through the degaussing port 113 at a same time (or a substantially same time). The degaussing circuit 130 may then operate for a predetermined amount of time (or for an undetermined amount of time).

On the other hand, when downloading data to the download interface 120 on the image display device, a download connector may be inserted into a download port 124 of the download interface 120. The signal processor 110 may then recognize a download to be performed when power is on. Data may be downloaded using the Data port 121 and the Clock port 122. In this circumstance, a degaussing operation is not performed through the degaussing port 113, and functions of various ports may be interrupted to prevent damage of the image display device during the downloading of data.

When the download connector is connected to the download port 124 of the download interface 120 (connected to the degaussing port 113 of the signal processor 110) and the power source is turned ON, then a degaussing operation is not performed and the download of data is performed. This may correspond to one mode of operation. Additionally, when the power source is turned ON and the download connector is not connected to the download port 124 of the download circuit 120 (connected to the degaussing port 113), then the degaussing operation is performed. This may correspond to another mode of operation.

Additionally, when the download connector is connected to the download port 124, a 5 V floating voltage may be applied to the download port 124 through the download connector and then operation of the degaussing circuit 130 is stopped. Other voltages may also be applied to the download port 124. That is, a sensed voltage (or sensed voltage level) at the download port 124 may be used to stop operations (or minimize operations) of the degaussing circuit 130. The voltage of the signal of the port 124 may be used to switch between a first mode and a second mode. The signal at the port 124 may be from an external apparatus such as a computer.

The degaussing port 113 may be utilized in the image display device. However, the degaussing port 113 may also not be shared with other functions. While this description refers to a degaussing port, the port may be any of a number of other ports. The name of degaussing port is merely for illustrative purposes. For example, the degaussing port 113 can be a port to control a cooling fan. The cooling fan may be operated simultaneously when a power source of the image display device is turned on. Accordingly, when a power source is turned ON and the download connector is not inserted, the cooling fan may be operated based on a cooling fan operating circuit. When the download connector is inserted, then the download of a program may be performed and the cooling fan operating circuit does not allow the cooling fan to operate.

As another example, the degaussing port 113 can be a port to control an output of a beep sound. The beep sound may be used to inform a user that the image display device is turned on. The beep sound may be outputted when a power source of the image display device is turned on. Accordingly, when a power source is turned ON and the download connector is not inserted, the beep sound may be outputted based on a beep sound operating circuit. On the other hand, when the download connector is inserted, then the download of a program may be performed and the beep sound operating circuit does not output the beep sound.

As another example, the degaussing port 113 can be a port to control a light emitting diode (LED) based on an LED operating circuit. Other operations using the degaussing port 113 are also within the scope of the present invention.

Figure 3:
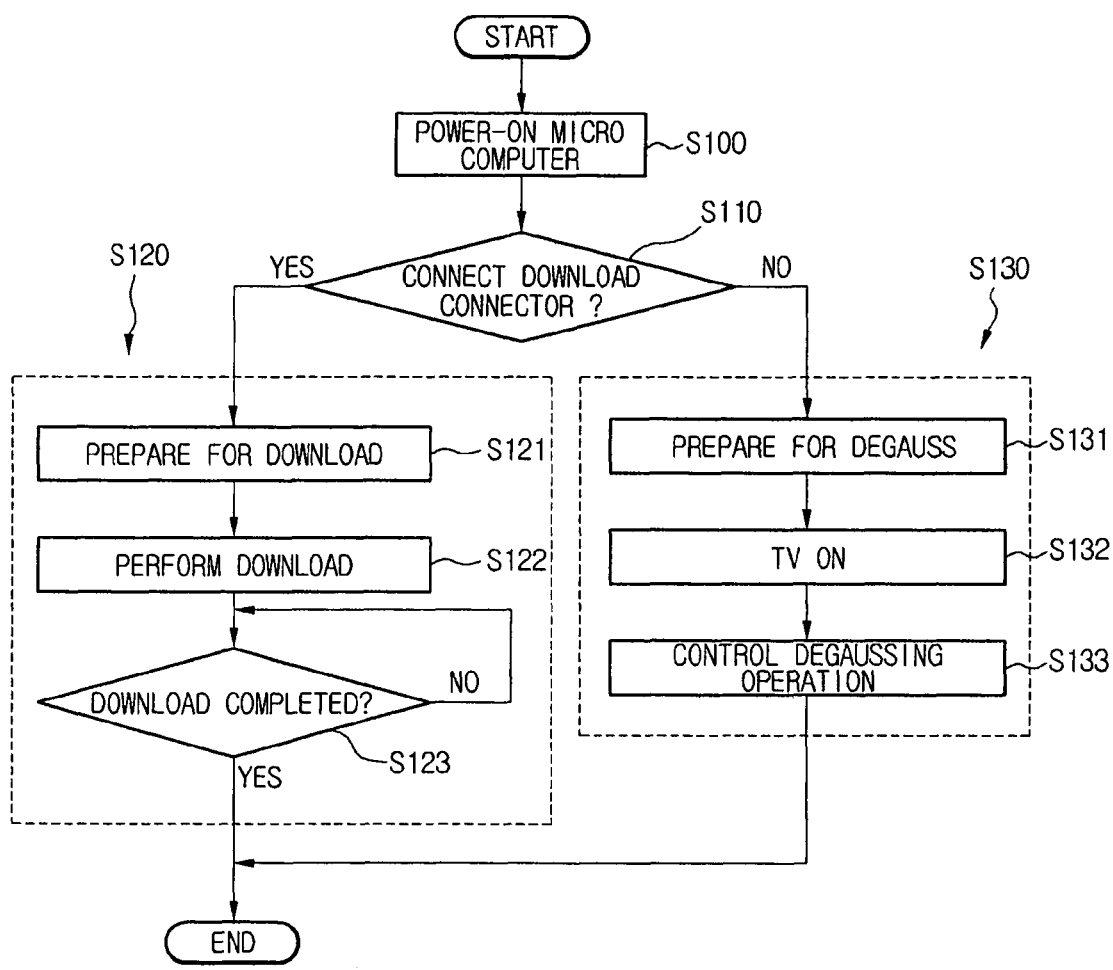
FIG. 3 is a flowchart of a method of controlling an image display device according to an example embodiment of the present invention.

FIG. 3 is a flowchart of a method of controlling an image display device according to an example embodiment of the present invention. Other operations, orders of operations and embodiments are also within the scope of the present invention.

In operation S100, a power source is applied to a signal processor (i.e., a micro computer). In operation S110, a determination is made whether a download connector is connected or not.

Based on the determination in operation S110, a download is performed through a predetermined port of the signal processor when the download connector is connected in operation S120.

On the other hand, a degaussing operation may be performed when the download connector is not connected in operation S130.

When the download connector is connected, the download process in operation S120 occurs. This may involve preparing for a download in operation S121, performing the download in operation S122, and terminating the download in operation S123 when the download is completed.

Additionally, when the download connector is not connected, the degaussing process in operation S130 occurs. This may involve preparing a degaussing operation in operation S131, turning on the image display device (i.e., the TV) in operation S132, and controlling a degaussing operation in operation S133. The downloading of data may not be performed in operation S130.

The image display device may allow one input/output port to perform a plurality of functions. Thus, space utilization of the PCB can be increased and/or maximized and design of the PCB can be easily done.

Moreover, the image display device can download programs (or portions of programs) stored in a computer on the image display device.

It will be apparent to those skilled in the art that various modifications and variations can be made to embodiments of the present invention. Thus, it is intended that embodiments of the present invention cover the modifications and variations provided they come within the scope of the appended claims and their equivalents.

The foregoing embodiments and advantages are merely exemplary and are not to be construed as limiting embodiments of the present invention. The present teaching can be readily applied to other types of apparatuses. The description of embodiments of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An image display device comprising:
a signal processor having a plurality of ports;
a degaussing circuit directly electrically connected to a first port of the signal processor to perform a degaussing operation during a first mode; and
a download interface directly electrically connected to the first port of the signal processor to download data during a second mode,
wherein when the download interface is directly electrically connected with the degaussing circuit to the first port of the signal processor at a same time, the signal processor to disallow the degaussing circuit to be operated, and the signal processor to allow the download interface to be operated regardless of a connection order of the download interface and the degaussing circuit to the first port.

2. The image display device of claim 1, wherein the download interface includes a download port electrically connected to the first port of signal processor, wherein the first mode or the second mode is determined based on a signal at the download port of the download interface.

3. The image display device of claim 2, wherein the first mode or the second mode is determined based on a change of a state of the signal at the download port.

4. The image display device of claim 1, wherein the first mode or the second mode is determined based on a change in voltage of a signal at a download port of the download interface.

5. The image display device of claim 2, wherein the signal is provided from an external source.

6. The image display device according to claim 1, wherein the download interface includes a clock port, a data port, and a download port.

7. The image display device according to claim 2, wherein the first mode is determined based on a download connector not being coupled to the download port of the download interface.

8. The image display device according to claim 7, wherein the second mode is determined based on the download connector being electrically connected to the download port of the download interface.

9. An image display device comprising:
a signal processor having a plurality of ports;
a degaussing circuit directly electrically connected to a first port of the signal processor to perform a degaussing operation; and
a download interface directly electrically connected to the first port of the signal processor, the download interface having a download port to download data, wherein the download interface is directly electrically connected with the degaussing circuit to the first port of the signal processor, and
wherein when the download interface is directly electrically connected with the operating circuit to the first port of the signal processor at a same time, the signal processor to disallow the degaussing circuit to be operated and the signal processor to allow the download interface to be operated regardless of a connection order of the download interface and the degaussing circuit to the first port.

10. The image display device of claim 9, wherein a first mode or a second mode is determined based on a signal at the download port of the download interface.

11. The image display device of claim 10, wherein the first mode or the second mode is determined based on a change of a state of the signal at the download port.

12. The image display device of claim 10, wherein the first mode or the second mode is determined based on a change in voltage of the signal at the download port.

13. The image display device of claim 10, wherein the signal is provided from an external source.

14. The image display device according to claim 9, wherein the signal processor determines whether a download connector is connected to the download port of the download interface when a power source is applied.

15. The image display device according to claim 9, wherein the degaussing circuit to perform a degaussing operation.

16. A method of controlling an image display device, the method comprising:
supplying a power source to a signal processor;
determining whether a download connector is connected to a download interface, the download interface being directly electrically connected with a degaussing circuit to a same first port of the single processor at a same time;
performing a function of the degaussing circuit that is directly electrically connected to the first port of the signal processor when the download connector is not connected to the download interface electrically; and performing a function of the download interface that is directly electrically connected with the degaussing circuit to the same first port of the signal processor at the same time, regardless of a connection order of the download interface and the degaussing circuit to the first port.

17. The method according to claim 16, wherein the comprises a degaussing circuit to perform a degaussing operation.

18. The method according to claim 16, wherein determining whether the download connector is connected to the download interface includes sensing a voltage level of a signal at a port of the download interface.

19. The method according to claim 18, wherein the signal is provided from a computer.

* * * * *